US009022646B2

(12) United States Patent
Hentschel et al.

(10) Patent No.: US 9,022,646 B2
(45) Date of Patent: May 5, 2015

(54) SENSOR MODULE FOR ACQUIRING THE TEMPERATURE IN THE INTERIOR OF A VEHICLE, AND DEVICE FOR DETERMINING THE TEMPERATURE IN THE INTERIOR OF A VEHICLE

(75) Inventors: Joachim Hentschel, Weitramsdorf (DE); Thomas Findeisen, Coburg (DE); Otto Mueller, Sesslach (DE)

(73) Assignee: VALEO Schalter and Sensoren GmbH, Bietigheim-Bissingen (DE)

( * ) Notice: Subject to any disclaimer, the term of this patent is extended or adjusted under 35 U.S.C. 154(b) by 105 days.

(21) Appl. No.: 13/641,468

(22) PCT Filed: Apr. 11, 2011

(86) PCT No.: PCT/EP2011/055589
§ 371 (c)(1),
(2), (4) Date: Oct. 16, 2012

(87) PCT Pub. No.: WO2011/131500
PCT Pub. Date: Oct. 27, 2011

(65) Prior Publication Data
US 2013/0034120 A1    Feb. 7, 2013

(30) Foreign Application Priority Data

Apr. 20, 2010    (DE) .................... 10 2010 015 657

(51) Int. Cl.
*G01K 1/14* (2006.01)
*G01K 1/00* (2006.01)
*G01K 1/20* (2006.01)

(52) U.S. Cl.
CPC .............. *G01K 1/20* (2013.01); *G01K 2201/02* (2013.01)

(58) Field of Classification Search
CPC .................................................. G01K 2201/02
USPC .......................... 374/121, 141, 208; 703/130
See application file for complete search history.

(56) References Cited

U.S. PATENT DOCUMENTS

| 4,149,220 A | * | 4/1979 | Crall et al. | ..................... 361/736 |
| 2004/0223534 A1 | * | 11/2004 | Trapp et al. | ................... 374/172 |

FOREIGN PATENT DOCUMENTS

| DE | 103 12 077 B3 | 8/2004 |
| DE | 10312077 | * 8/2004 |
| DE | 100 49 979 C5 | 12/2005 |
| EP | 1 457 365 B1 | 5/2007 |

OTHER PUBLICATIONS

International Seach Report w/translation issued in PCT/EP2011/055589 mailed Aug. 25, 2011 (4 pages).

* cited by examiner

*Primary Examiner* — Lisa Caputo
*Assistant Examiner* — Nasir U Ahmed
(74) *Attorney, Agent, or Firm* — Osha Liang LLP

(57) ABSTRACT

A sensor module for acquiring the temperature in the interior of a vehicle is disclosed. The sensor module has a temperature sensor for acquiring the interior temperature, and a radiation sensor for acquiring an insolation. Information provided by the radiation sensor is used to correct the interior temperature acquired by the temperature sensor, and the temperature sensor and the radiation sensor are arranged in a common first housing and make electrical contact with conductor tracks of a carrier board via first contact elements. A device for determining the temperature in the interior of a vehicle with the aid of such a sensor module is also disclosed.

11 Claims, 3 Drawing Sheets

SENSOR MODULE FOR ACQUIRING THE TEMPERATURE IN THE INTERIOR OF A VEHICLE, AND DEVICE FOR DETERMINING THE TEMPERATURE IN THE INTERIOR OF A VEHICLE

The invention relates to a sensor module for acquiring the temperature in the interior of a vehicle and to an associated device for determining the temperature in the interior of a vehicle.

Air-conditioning systems for vehicles are disclosed in the prior art, which air-conditioning systems determine an interior temperature of the vehicle via a temperature sensor which determines the temperature of an air stream in a duct, the air stream being generated in the duct by a ventilation motor. Unventilated devices are used in modern vehicles to determine the temperature in the interior of a vehicle in order to avoid the ventilation motor.

By way of example, such an unventilated device for determining the temperature in the interior of a vehicle is described in the amended patent DE 100 49 979 C5. The device described comprises a first temperature sensor which is arranged behind a wall adjoining the interior, a processing unit which receives the measurement signal of the temperature sensor and outputs an output signal representing the temperature in the interior of the vehicle, a heat conduction element which acquires the temperature of the air of the interior inside the area thereof near the wall, and a first solar sensor which is arranged in the opening in the wall. Furthermore, the heat conduction element is in thermal conductive contact with the temperature sensor and extends through an opening in the wall. In addition, the first solar sensor has a housing in which a foot diode and electrodes leading thereto are arranged, the heat conduction element being formed solely by one of the electrodes.

Patent EP 1 457 365 B1 describes a device for acquiring the temperature in the interior of a vehicle, in particular for an air-conditioning system of a vehicle. The device described comprises an interior temperature sensor which is arranged in a housing that is arranged in or on a wall adjoining the interior of the vehicle and at least partially adjoins the interior of the vehicle, a compensation temperature sensor which is arranged behind the wall and in a fashion thermally decoupled from the interior temperature sensor and detects heat from air and/or modules behind the wall that could lead to a corruption of the measured value of the interior temperature sensor, and a radiation sensor which acquires solar radiation leading to the heating of the housing of the interior temperature sensor. Here, the two temperature sensors and the radiation sensor are combined to form a common module.

The object of the invention is to develop a sensor module for acquiring the temperature in the interior of a vehicle and a corresponding device for determining the temperature in the interior of a vehicle so as to enable a cost effective and simple improvement of the thermal insulation of the sensor module.

This object is achieved according to the invention by a sensor module for acquiring the temperature in the interior of a vehicle and by a device for determining the temperature in the interior of a vehicle.

The advantage attained with the invention consists in that the thermal insulation of the sensor module can be improved in a simple way by the second housing and the air layers present between the surfaces of the carrier board and the corresponding walls of the second housing.

In addition, the embodiments of the present invention can improve the thermal decoupling between the sensor module and further temperature sensors, which are used, for example, in an inventive device for determining the temperature in the interior of a vehicle in order to correct the interior temperature acquired with the aid of the inventive sensor module.

In other words, embodiments of the invention enable a better decoupling and compensation of the temperature influences in the region of an interior temperature sensor, owing to a compact design. Furthermore, an improvement in the dynamic behaviour of the inventive sensor module can be attained by balancing exhaust temperatures and exhaust quantities of an associated air-conditioning system. The system can thereby be adaptively adjusted with the aid of these technical improvements.

Consequently, the inventive sensor module for acquiring the temperature in the interior of a vehicle comprises a temperature sensor for acquiring the interior temperature, and a radiation sensor for acquiring an insolation, information provided by the radiation sensor being used to correct the interior temperature acquired by the temperature sensor, and the temperature sensor and the radiation sensor being arranged in a common first housing and making electrical contact with conductor tracks of a carrier board via first contact elements. According to the invention, a second housing is provided, which surrounds at least the first contact elements and the carrier board so that an air layer is respectively present between the surfaces of the carrier board and corresponding walls of the second housing, for the purpose of temperature insulation.

The inventive device for determining the temperature in the interior of a vehicle comprises a first temperature sensor for acquiring the interior temperature, a second temperature sensor for acquiring the temperature of an air stream and/or of modules in the surroundings of the first temperature sensor, and a radiation sensor for acquiring the insolation, information provided by the second temperature sensor and/or radiation sensor being used to correct the interior temperature acquired by the first temperature sensor, and the first temperature sensor and the radiation sensor being arranged in a common housing and making electrical contact with conductor tracks of a first carrier board via first contact elements. According to the invention, the first temperature sensor and the radiation sensor are designed as parts of an inventive sensor module. In this case, temperature is acquired and processing is performed by means of the first temperature sensor and the radiation sensor, designed as a photodiode, for example, the radiation sensor designed as a photodiode being used to compensate the solar influence. The second temperature sensor is used to compensate the temperature influences on the first carrier board of the sensor module. The basic idea of the invention is to improve the thermal decoupling of the inventive sensor module.

In an advantageous refinement of the inventive sensor module, the carrier board is electrically connected via second contact elements to at least one control board on which an evaluation and control circuit is arranged. The second contact elements are designed, for example, as plug pins which advantageously enable a simple electrical and mechanical connection with the control board via corresponding contacting elements.

In a further advantageous refinement of the inventive sensor module, the conductor tracks are arranged meanderingly and/or in looped fashion at least on a surface of the carrier board. This extension of the conductor tracks further improves the thermal decoupling of the inventive sensor module from interference, and minimizes the temperature influence.

In an advantageous refinement of the inventive device, the second temperature sensor acquires the temperature of an air stream in a substantially sealed sensor space which surrounds the second housing at least in part. The second temperature sensor is advantageously arranged on a second carrier board and makes electrical contact with conductor tracks. Here, as well, the conductor tracks are arranged meanderingly and/or in looped fashion at least on a surface of the second carrier board, in order to improve the thermal decoupling in relation to the sensor module. The sensor space is, for example, laterally bounded by at least one boundary wall. In order to determine the temperature influences caused by the at least one boundary wall, the second carrier board is thermally coupled to the at least one boundary wall of the sensor space via at least one transition surface.

In a further advantageous refinement of the inventive device, the second carrier board is electrically connected via third contact elements to at least one control board on which an evaluation and control circuit is arranged. The function of the evaluation and control circuit consists substantially in receiving and evaluating the measurement signals of the various sensors in order to determine the current temperature in the interior of the vehicle. The third contact elements are, for example, designed as plug pins which advantageously enable a simple electrical and mechanical connection with the control board via corresponding contacting elements. In addition, the second carrier board can be mechanically connected to the second housing of the sensor module in order to form a preassembled unit. The mechanical connecting means are, for example, designed as corresponding catch elements.

An exemplary embodiment of the invention is described in more detail below with the aid of a drawing, in which.

Figure 1:
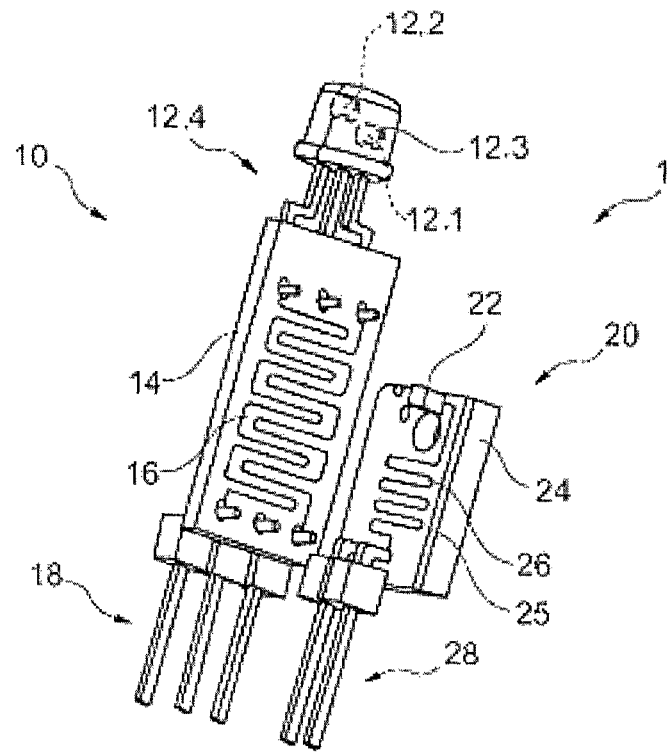
FIG. 1 shows a diagrammatic perspective illustration of an exemplary embodiment of an inventive sensor module for acquiring the temperature in the interior of a vehicle, without a second housing and a second sensor module which are respectively part of an inventive device for determining the temperature in the interior of a vehicle.

As is to be seen from FIGS. 1 to 6, an exemplary embodiment of an inventive device 1 for determining the temperature in the interior of a vehicle comprises a first sensor module 10 for acquiring the temperature in the interior of a vehicle, which comprises a first temperature sensor 12.1 for acquiring the interior temperature and a radiation sensor 12.2 for acquiring an insolation, and a second sensor module 20 with a second temperature sensor 22 for acquiring the temperature of an air stream 32 and/or of modules 34 in the surroundings of the first temperature sensor 12.1.

As may further be seen from FIGS. 1 to 6, the first temperature sensor 12.1 and the radiation sensor 12.2 are arranged in a common housing 12.3 and make electrical contact with conductor tracks 16 of a first carrier board 14 via first contact elements 12.4. The second temperature sensor 22 is arranged on a second carrier board 24 and likewise makes electrical contact with conductor tracks 26. As may further be seen from FIGS. 1 and 2, via second contact elements 18 the first carrier board 14, and via third contact elements the second carrier board 24 can be electrically connected to at least one control board on which an evaluation and control circuit (not illustrated) is arranged. The evaluation and control circuit receives the measurement signals of the various sensors and evaluates the received signals in order to determine the current temperature in the interior of the vehicle.

According to the invention, a second housing 11 is provided which surrounds at least the first contact elements 12.4 and the first carrier board 14 so that an air layer is respectively present between surfaces 14.1, 14.2 of the carrier board 14 and corresponding walls 11.1, 11.2 of the second housing 11, for the purpose of temperature insulation.

The information provided by the second temperature sensor 22 and/or the radiation sensor 12.2 is used to correct the interior temperature acquired by the first temperature sensor 12.1. As may be seen, in particular, from FIGS. 1 and 2, the conductor tracks 16 are arranged on the surfaces 14.1, 14.2 of the first carrier board 14, and the conductor tracks 26 are arranged on the surfaces of the second carrier board 24 in a meandering and/or looped fashion, in order to further improve the thermal decoupling between the temperature sensors 12.1, 22.

As may be seen, in particular, from FIGS. 3 to 6, in the exemplary embodiment illustrated the second temperature sensor 22 acquires, firstly, the temperature of an air stream 32 in a substantially sealed sensor space 30 which at least partially surrounds the second housing 11, and, secondly, acquires the temperature of at least one boundary wall 34 of the sensor space 30 by a thermal coupling via at least one transition surface 25. The second sensor module 20 serves to determine the thermal environmental conditions of the first sensor module 10. The second temperature sensor 22 makes electrical contact with the second carrier board 24, which attains thermal decoupling by the long and thin conductor tracks 26. Likewise, the second sensor module 20 determines the thermal input through the wall to the first sensor module 10 by means of an applied thick conductor track 25 which is positively clamped into a further housing 34.

Figure 2:
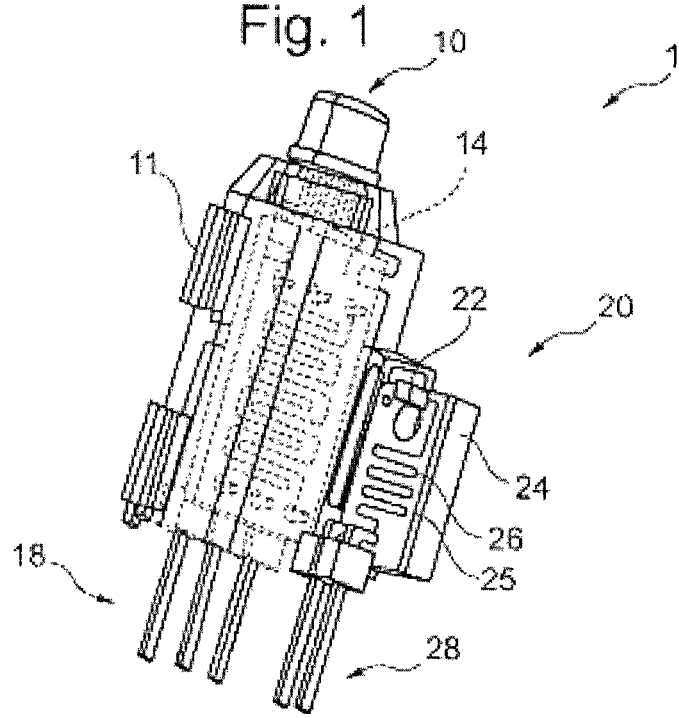
FIG. 2 shows a diagrammatic perspective illustration of the exemplary embodiment of the inventive sensor module for acquiring the temperature in the interior of a vehicle, with the second housing and the second sensor module which are respectively part of the inventive device for determining the temperature in the interior of a vehicle.
Figure 3:
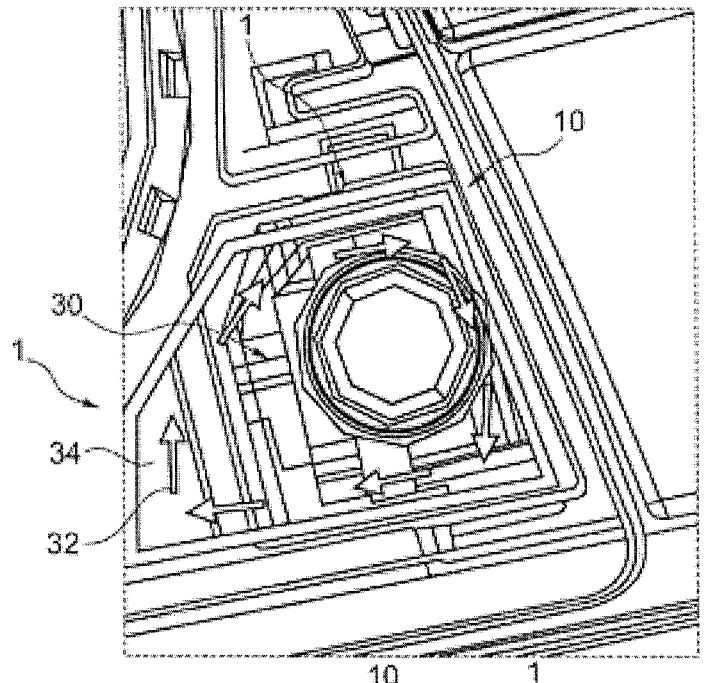
FIG. 3 shows a diagrammatic top view of an exemplary embodiment of an inventive device for determining the temperature in the interior of a vehicle, in the installed state.
Figure 4:
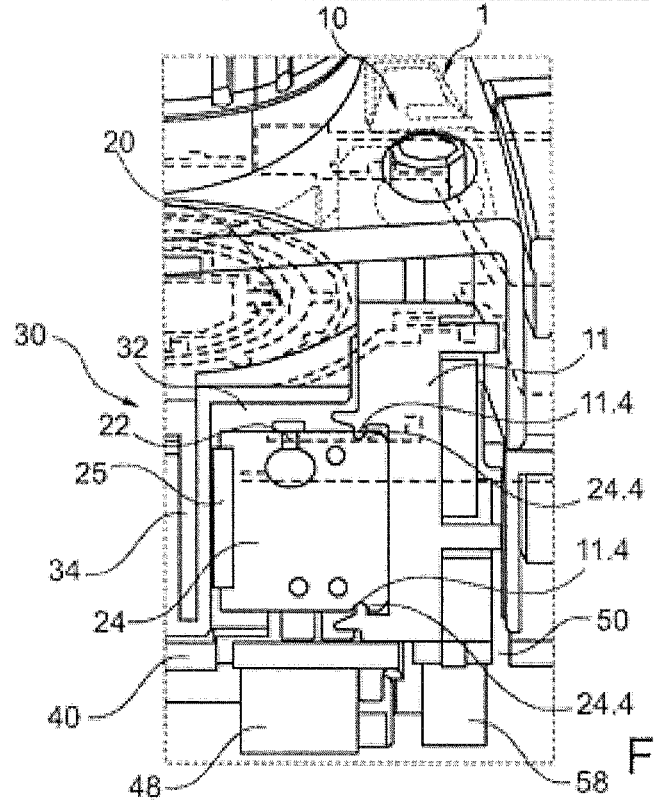
FIG. 4 shows a first sectional illustration of the exemplary embodiment of the inventive device for determining the temperature in the interior of a vehicle from FIG. 3.
Figure 5:
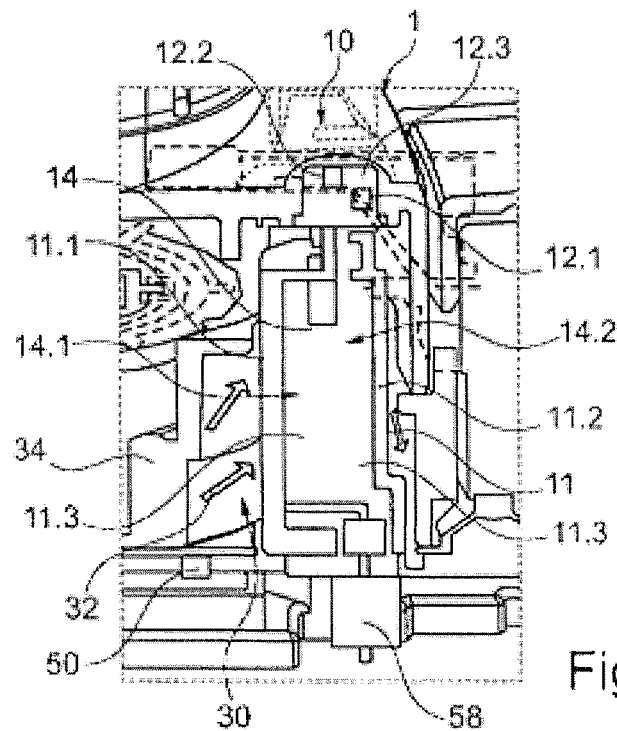
FIG. 5 shows a second sectional illustration of the exemplary embodiment of the inventive device for determining the temperature in the interior of a vehicle from FIG. 3.
Figure 6:
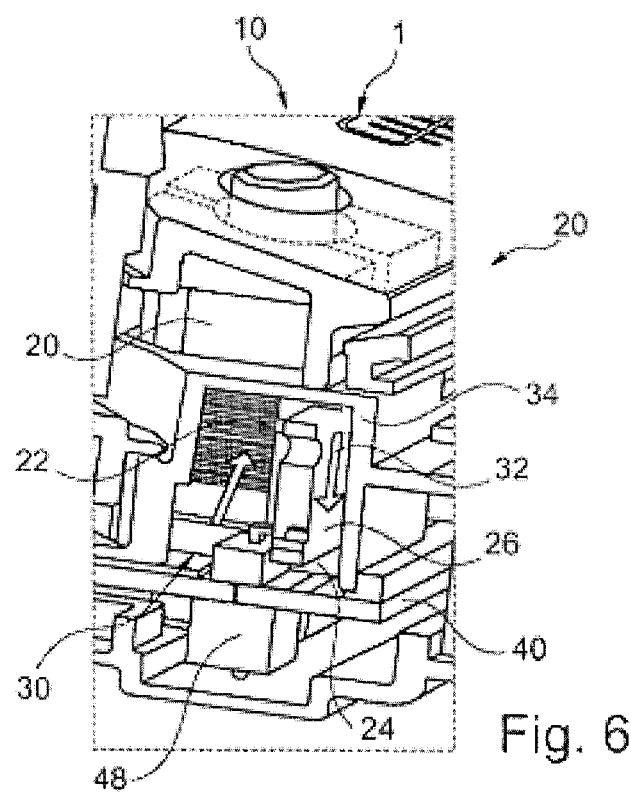
FIG. 6 shows a third sectional illustration of the exemplary embodiment of the inventive device for determining the temperature in the interior of a vehicle from FIG. 3.

As is further to be seen from FIGS. 2 and 4, the second carrier board 24 is mechanically connected to the second housing 11 of the first sensor module 10. In the exemplary embodiment illustrated, the mechanical connecting means are designed as corresponding catch elements 11.4, 24.4, for example as catch tab 11.4 and corresponding catch recess 24.4, it also being possible to imagine other types of connection such as, for example, a clip connection etc.

The evaluation and control circuit (not illustrated) arranged on the at least one control board 40, 50 receives via the electrical contact elements 18 and 28, respectively, and corresponding contacting elements 48, 58 the temperature values acquired by the temperature sensors 12.1, 22 and the radiation values acquired by the radiation sensor 12.2, and determines therefrom the current interior temperature which it passes on via a vehicle bus system, for example, to the evaluation and control unit of the air-conditioning system and/or other applications in the vehicle.

The invention claimed is:

1. An apparatus A sensor module for acquiring the temperature in an interior of a vehicle, comprising:
   a first sensor module comprising:

a first temperature sensor for acquiring the interior temperature; and a radiation sensor for acquiring an insolation, wherein information provided by the radiation sensor is used to correct the interior temperature acquired by the first temperature sensor, wherein the first temperature sensor and the radiation sensor are arranged in a common first housing and make electrical contact with conductor tracks of a first carrier board via first contact elements, and wherein the first contact elements and the first carrier board are surrounded by a second housing, so that an air layer is respectively present between surfaces of the carrier board and corresponding walls of the second housing, and a second sensor module comprising:

a second temperature sensor on a second carrier board for acquiring a temperature of at least one of an air stream and modules surrounding the first temperature sensor, wherein the second temperature sensor acquires the temperature of the air stream in a substantially sealed sensor space which surrounds the second housing at least in part.

2. The apparatus sensor module according to claim 1, wherein the first carrier board is electrically connected via second contact elements to at least one control board on which an evaluation and control circuit is arranged.

3. The apparatus sensor module-according to claim 1, wherein the conductor tracks are arranged meanderingly and/or in looped fashion at least on a surface of the first carrier board.

4. A device for determining the temperature in the interior of a vehicle, comprising:

a first temperature sensor for acquiring the interior temperature;

a second temperature sensor for acquiring the temperature of an air stream and/or of modules in the surroundings of the first temperature sensor; and a radiation sensor for acquiring an insolation, wherein information provided by at least one of the second temperature sensor and the radiation sensor is used to correct the interior temperature acquired by the first temperature sensor, the first temperature sensor and the radiation sensor being arranged in a common housing and making electrical contact with conductor tracks of a first carrier board via first contact elements wherein the second temperature sensor is on a second carrier board, wherein the first temperature sensor and the radiation sensor are parts of a sensor module comprising the common housing and a second housing which surrounds at least the first contact elements and the first carrier board so that an air layer is respectively present between surfaces of the first carrier board and corresponding walls of the second housing, and wherein the second temperature sensor acquires the temperature of an air stream in a substantially sealed sensor space which surrounds the second housing at least in part.

5. The device according to claim 4, wherein the second temperature sensor is arranged on the a second carrier board and makes electrical contact with conductor tracks.

6. The device according to claim 5, wherein the conductor tracks are arranged meanderingly and/or in looped fashion at least on a surface of the second carrier board.

7. The device according to claim 5, wherein the second carrier board is thermally coupled to at least one boundary wall of a sensor space which surrounds the second housing at least in part via at least one transition surface.

8. The device according to claim 5, wherein the second carrier board is electrically connected via third contact elements to at least one control board on which an evaluation and control circuit is arranged.

9. The device according to claim 5, wherein the second carrier board is mechanically connected to the second housing.

10. The device according to claim 9, wherein the second carrier board is mechanically connected to the second housing by corresponding catch elements.

11. The device according to claim 4, wherein the sensor space is laterally bounded by at least one boundary wall.

* * * * *